US012712126B2

(12) United States Patent
Kim et al.

(10) Patent No.: US 12,712,126 B2
(45) Date of Patent: Aug. 18, 2026

(54) MULTILAYER ELECTRONIC COMPONENT

(71) Applicant: SAMSUNG ELECTRO-MECHANICS CO., LTD., Suwon-si (KR)

(72) Inventors: Je Jung Kim, Suwon-si (KR); Jeong Mo Kang, Suwon-si (KR); Seong Min Oh, Suwon-si (KR); Eon Ju Noh, Suwon-si (KR); Jin Hwan Kim, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 89 days.

(21) Appl. No.: 18/417,590

(22) Filed: Jan. 19, 2024

(65) Prior Publication Data

US 2024/0274355 A1 Aug. 15, 2024

(30) Foreign Application Priority Data

Feb. 15, 2023 (KR) ........................ 10-2023-0019938

(51) Int. Cl.
*H01G 4/012* (2006.01)
*H01G 4/12* (2006.01)
(Continued)

(52) U.S. Cl.
CPC ............... *H01G 4/012* (2013.01); *H01G 4/30* (2013.01); *H01G 4/1227* (2013.01); *H01G 4/2325* (2013.01)

(58) Field of Classification Search
CPC .......... H01G 4/30; H01G 4/005; H01G 4/012; H01G 4/1227; H01G 4/2325; H01G 4/008
(Continued)

(56) References Cited

U.S. PATENT DOCUMENTS 5,486,277 A * 1/1996 Barbee, Jr. .......... C23C 14/0036 204/192.15
9,099,246 B1 * 8/2015 Kitano .................. H01G 4/012
(Continued)

FOREIGN PATENT DOCUMENTS

EP 0186765 A2 7/1986
JP H08-148371 A 6/1996
(Continued)

OTHER PUBLICATIONS

Extended European Search Report dated Jan. 2, 2025, issued in corresponding European Patent Application No. 24152114.5.

*Primary Examiner* — Arun Ramaswamy
(74) *Attorney, Agent, or Firm* — MORGAN, LEWIS & BOCKIUS LLP

(57) ABSTRACT

A multilayer electronic component includes first and second internal electrodes alternately disposed with the dielectric layer interposed therebetween and connected to first and second external electrodes, respectively, in which the first and second internal electrodes include first and second bend portions, respectively, bent in margin regions of a body adjacent to third and fourth surfaces of the body, respectively. The present disclosure is intended to control an angle of the first and second bent portions so that the moisture resistance reliability of the multilayer electronic component is not reduced even if the bent portion is formed in a region in which the first internal electrode is adjacent to the third surface and a region in which the second internal electrode is adjacent to the fourth surface.

13 Claims, 5 Drawing Sheets

(51) Int. Cl.
*H01G 4/232* (2006.01)
*H01G 4/30* (2006.01)

(58) Field of Classification Search
USPC .................................. 361/301.4, 303, 321.1
See application file for complete search history.

(56) References Cited

U.S. PATENT DOCUMENTS

| | | | | |
|---|---|---|---|---|
| 11,404,213 | B2 * | 8/2022 | Kokawa | H01G 4/1227 |
| 2006/0256504 | A1 * | 11/2006 | Kojima | H01G 4/30 361/311 |
| 2012/0327556 | A1 * | 12/2012 | Ahn | H01G 4/12 361/321.2 |
| 2013/0250472 | A1 * | 9/2013 | Lee | H01G 4/012 361/301.4 |
| 2014/0301014 | A1 * | 10/2014 | Kim | H01G 4/30 156/89.12 |
| 2015/0116902 | A1 | 4/2015 | Sakai | |
| 2016/0233024 | A1 * | 8/2016 | Kim | H01G 4/30 |
| 2021/0166874 | A1 | 6/2021 | Tanaka | |
| 2021/0166882 | A1 | 6/2021 | Nishiura | |

FOREIGN PATENT DOCUMENTS

| | | | |
|---|---|---|---|
| JP | H09-260193 | A | 10/1997 |
| JP | H11-054365 | A | 2/1999 |
| JP | 2003-045740 | A | 2/2003 |
| JP | 2021-086972 | A | 6/2021 |
| JP | 2021-089940 | A | 6/2021 |
| KR | 10-2014-0094110 | A | 7/2014 |

* cited by examiner

D1 D2 D3 · · · Dn
G1 G2 G3 · · · Gn
L1
121
Ac
FIRST DIRECTION
SECOND DIRECTION

MULTILAYER ELECTRONIC COMPONENT

CROSS-REFERENCE TO RELATED APPLICATION(S)

The present application claims the benefit of priority to Korean Patent Application No. 10-2023-0019938 filed on Feb. 15, 2023 in the Korean Intellectual Property Office, the entire disclosure of which is incorporated herein by reference.

TECHNICAL FIELD

The present disclosure relates to a multilayer electronic component.

BACKGROUND

A multilayer ceramic capacitor (MLCC), a multilayer electronic component, is a chip-type condenser mounted on the printed circuit boards of various electronic products such as image display devices including a liquid crystal display (LCD) and a plasma display panel (PDP), computers, smartphones, and mobile phones, and serves to charge or discharge electricity therein or therefrom.

As electronics become smaller, slimmer, and multifunctional, chip components are also required to be compact, and electronic components are also mounted to become high-integrated. In response to this trend, a space between mounted electronic components has been minimized.

Furthermore, as industry interest in electronic components increases, ceramic capacitors are also required to have high capacity, high reliability, and high strength characteristics for use in automobiles or infotainment systems. Specifically, as an ADAS technology of automobiles becomes more advanced, demand for electric and electronic MLCC having high-capacity, high-reliability is increasing, and thus, new technological development is required.

As a means to improve capacitance of multilayer electronic components such as multilayer ceramic capacitors, there have been attempts to improve the lamination of an internal electrode and a dielectric layer. In this case, in order to connect the internal electrodes to the external electrodes with different polarities, margins with different degrees of stacking of internal electrodes may be formed in a body of the multilayer electronic component, and a bent portion may be formed in the internal electrode included in the margin portion by undergoing processes such as lamination and press cutting. Since the bent portion of the internal electrode is a portion in which an external electrode is formed at an end thereof, it may be vulnerable to external moisture penetration. Accordingly, as the bent portion is formed in the internal electrode, it may be required to solve a problem that the moisture resistance reliability of the multilayer electronic component becomes weak.

The information disclosed in the Background section above is to aid in the understanding of the background of the present disclosure, and should not be taken as acknowledgement that this information forms any part of prior art.

SUMMARY

The present disclosure according to one aspect attempts to solve a problem in which moisture resistance reliability of a multilayer electronic component becomes weak as a bent portion is formed in an internal electrode.

The present disclosure according to one aspect also attempts to alleviate a phenomenon in which delamination occurs due to a decrease of adhesive force between an internal electrode and a dielectric layer due to a difference in degrees of stacking of the internal electrodes of a capacitance formation portion and a margin portion.

However, the aspects of the present disclosure are not limited to the above-described contents, and may be more easily understood in the process of describing specific embodiments of the present disclosure.

According to an aspect of the present disclosure, a multilayer electronic component includes: a body including a dielectric layer and first and second internal electrodes alternately disposed in a first direction with the dielectric layer interposed therebetween, and including a first surface and a second surface opposing each other in the first direction, a third surface and a fourth surface connected to the first surface and the second surface and opposing each other in a second direction, and a fifth surface and a sixth surface connected to the first surface to the fourth surface and opposing each other in a third direction; a first external electrode disposed on the third surface and connected to the first internal electrode; and a second external electrode disposed on the fourth surface and connected to the second internal electrode, wherein the first internal electrode is connected to the third surface and is spaced apart from the fourth surface, and the second internal electrode is connected to the fourth surface and is spaced apart from the third surface, the first internal electrode includes a first bent portion bent in a region adjacent to the third surface, and the second internal electrode includes a second bent portion bent in a region adjacent to the fourth surface, and when a straight line in parallel with the second direction and in contact with the first or second internal electrode is referred to as L1, a straight line connecting a point at which the first internal electrode is in contact with the third surface and the first bent portion or a straight line connecting a point at which the second internal electrode is in contact with the fourth surface and the second bent portion is referred to as L2, an acute angle formed by L1 and L2 is referred to as T, and an average value of the T is referred to as $\overline{T}$, $\tan(\overline{T})$ satisfies 0.1 or more and 0.5 or less.

One of various effects of the present disclosure is to improve moisture resistance reliability of a multilayer electronic component by adjusting an angle of a bent portion of an internal electrode.

One of various effects of the present disclosure is to alleviate a phenomenon in which delamination occurs in a multilayer electronic component by adjusting an angle of a bent portion of an internal electrode.

Advantages and effects of the present application are not limited to the foregoing content and may be more easily understood in the process of describing a specific exemplary embodiment of the present disclosure.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
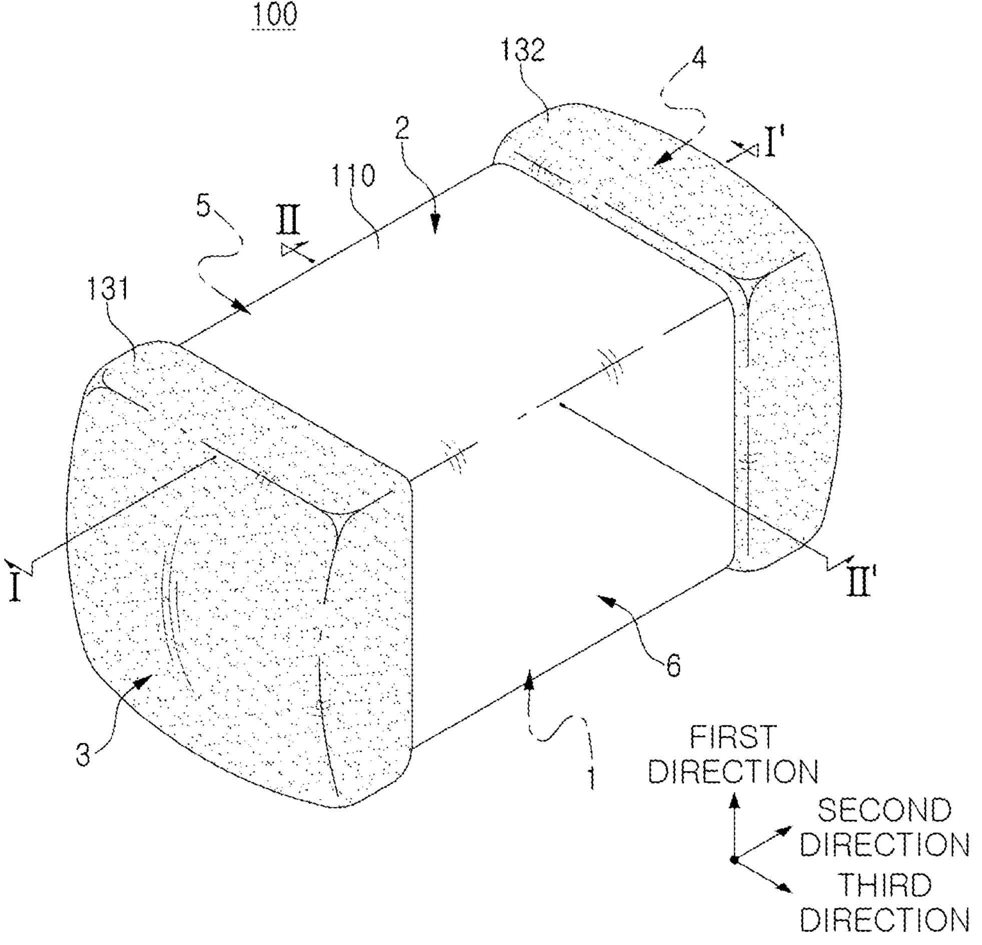
FIG. 1 is a perspective view schematically illustrating a multilayer electronic component according to an exemplary embodiment of the present disclosure.

Hereinafter, exemplary embodiments of the present disclosure will be described with reference to specific exemplary embodiments and the attached drawings. The exemplary embodiments of the present disclosure may, however, be exemplified in many different forms and should not be construed as being limited to the specific embodiments set forth herein. Furthermore, the exemplary embodiments disclosed herein are provided for those skilled in the art to better explain the present disclosure. In the drawings, the shapes and dimensions of elements may be exaggerated for clarity, and the same reference numerals will be used throughout to designate the same or like elements.

In addition, in order to clearly describe the present disclosure in the drawings, the contents unrelated to the description are omitted, and since sizes and thicknesses of each component illustrated in the drawings are arbitrarily shown for convenience of description, the present disclosure is not limited thereto. In addition, components with the same function within the same range of ideas are described using the same reference numerals. Throughout the specification, when a certain portion "includes" or "comprises" a certain component, this indicates that other components are not excluded and may be further included unless otherwise noted.

In the drawings, a first direction may be defined as a direction in which first and second internal electrodes are alternately disposed with the dielectric layer interposed therebetween, or a thickness T direction, and among second and third directions perpendicular to the first direction, a second direction may be defined as a length L direction, and a third direction may be defined as a width W direction.

FIG. 1 is a perspective view schematically illustrating a multilayer electronic component according to an exemplary embodiment of the present disclosure.

Figure 2:
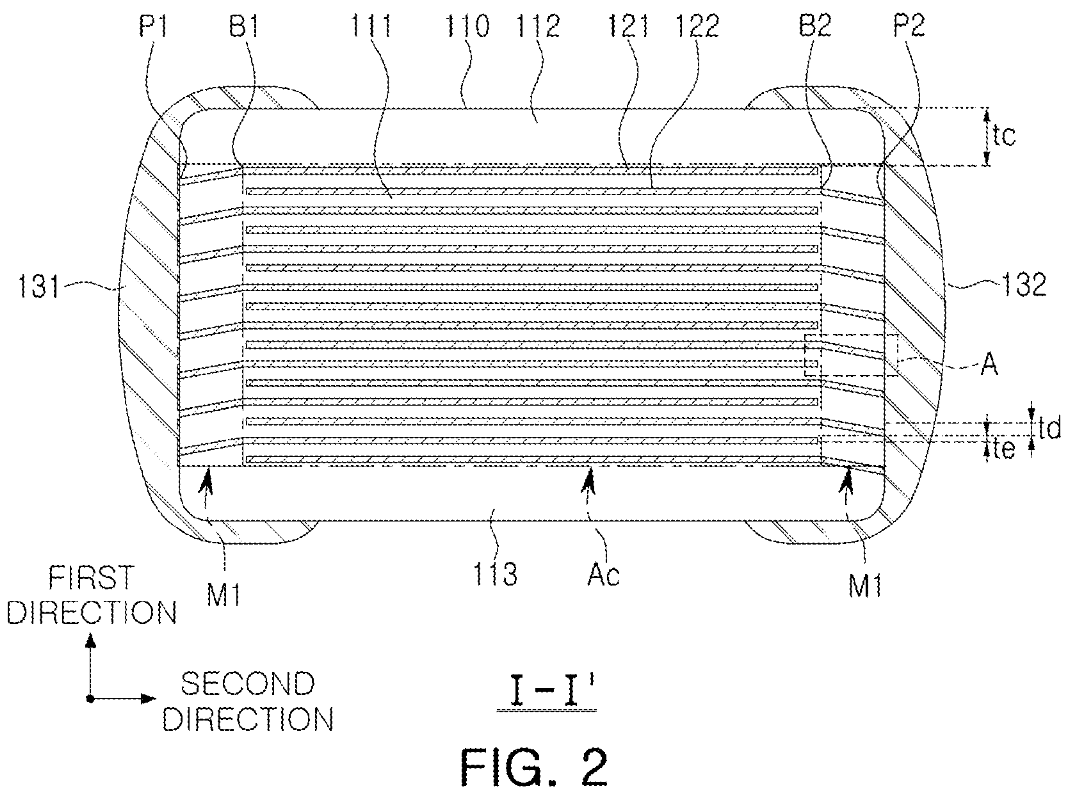
FIG. 2 is a cross-sectional view taken along line I-I' of FIG. 1.

FIG. 2 is a cross-sectional view taken along line I-I' of FIG. 1.

Figure 3:
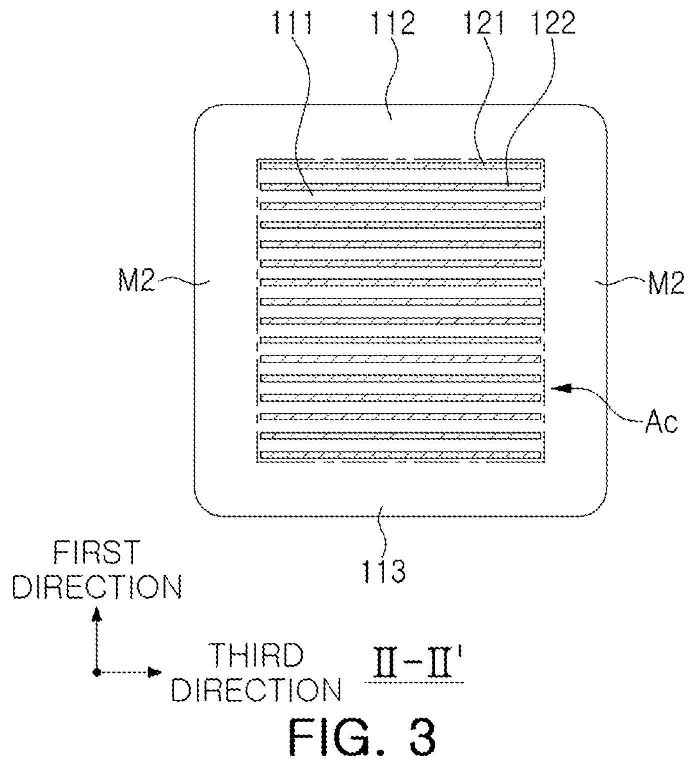
FIG. 3 is a cross-sectional view taken along line II-II' of FIG. 1.

FIG. 3 is a cross-sectional view taken along line II-II' of FIG. 1.

Figure 4:
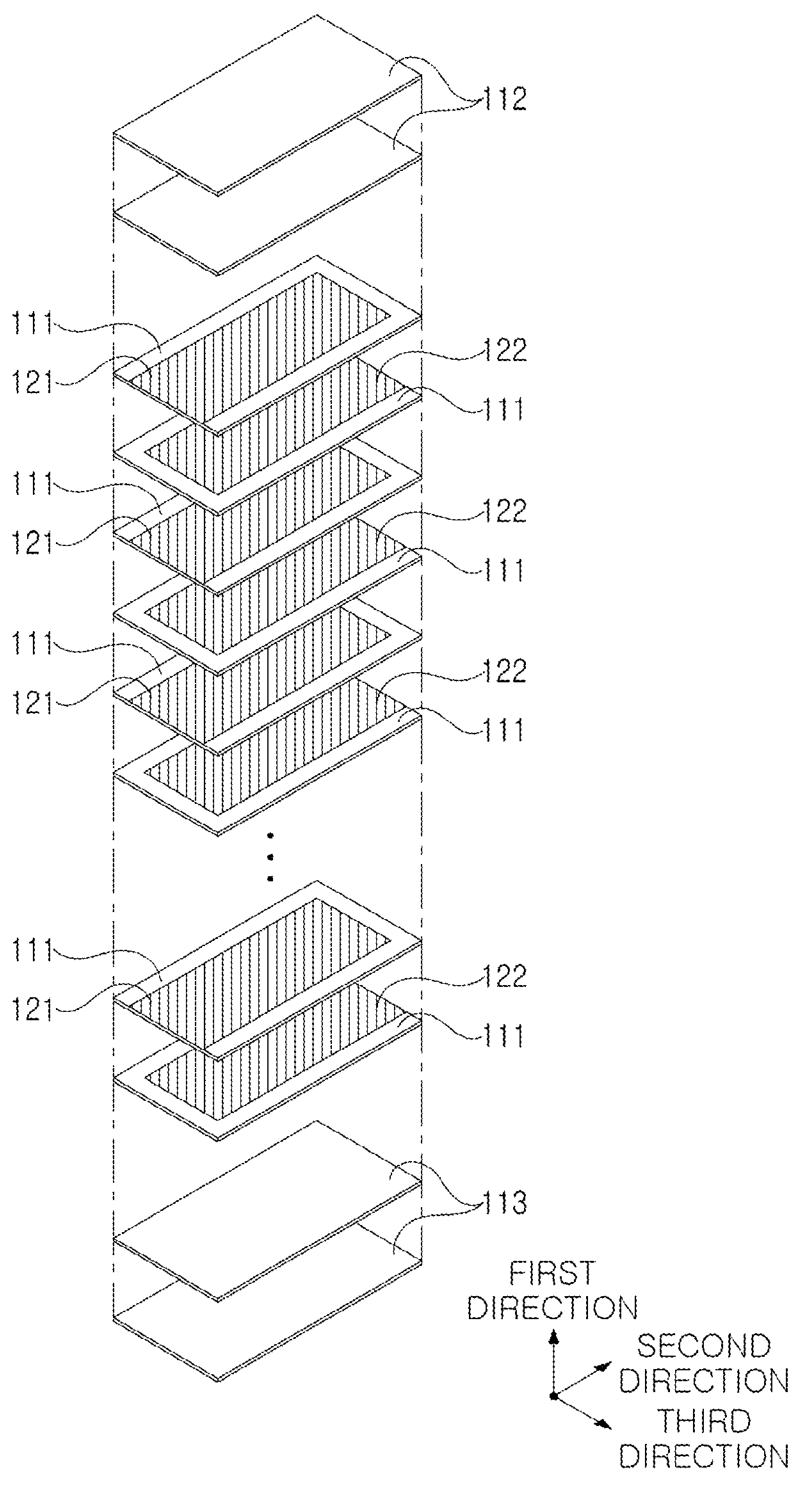
FIG. 4 is an exploded perspective view illustrating a body according to an exemplary embodiment of the present disclosure.

FIG. 4 is an exploded perspective view illustrating a body according to an exemplary embodiment of the present disclosure.

Figure 5:
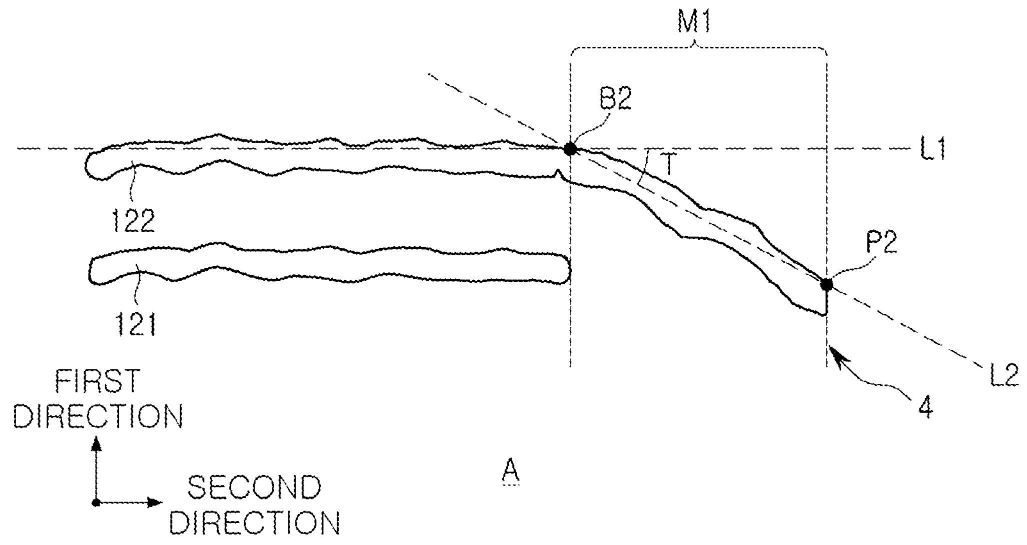
FIG. 5 is an enlarged schematic view of region A of FIG. 2.

FIG. 5 is an enlarged schematic view of region A of FIG. 2.

Figure 6:
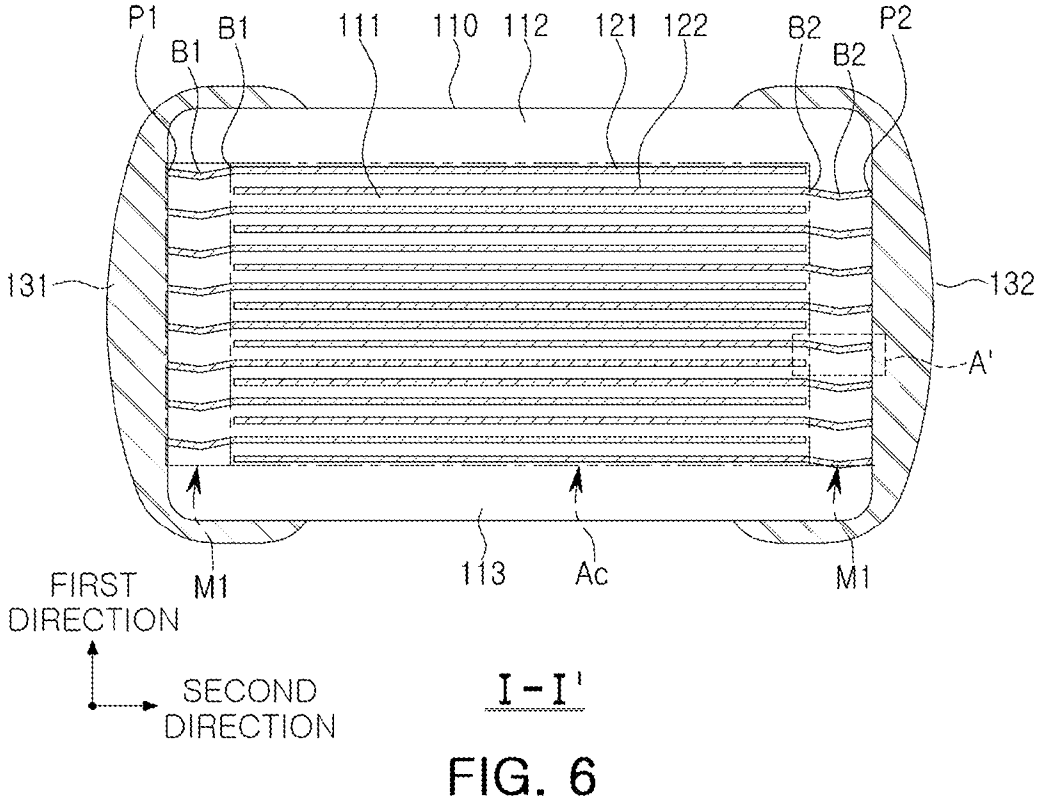
FIG. 6 is a cross-sectional view taken along line I-I' of FIG. 1 corresponding to an exemplary embodiment.

FIG. 6 is a cross-sectional view taken along line I-I' of FIG. 1 corresponding to an exemplary embodiment.

Figures 7, 8:
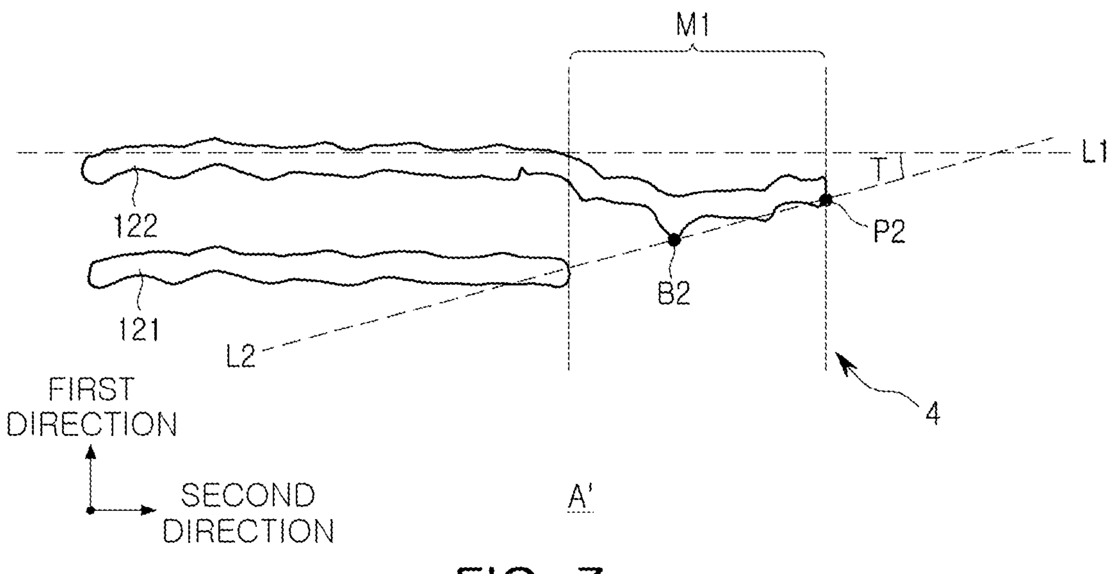
FIG. 7 is an enlarged schematic view of r'gion A' of FIG. 6.
FIG. 8 is a schematic view illustrating a method of determining a straight line L1 according to an exemplary embodiment.

FIG. 7 is an enlarged schematic view of r'gion A' of FIG. 6.

FIG. 8 is a schematic view illustrating a method of determining a straight line L1 according to an exemplary embodiment.

Hereinafter, a multilayer electronic component 100 according to an exemplary embodiment of the present disclosure will be described in detail with reference to FIGS. 1 to 5 and 8.

A multilayer electronic component 100 according to an exemplary embodiment of the present disclosure includes a dielectric layer 111 and first and second internal electrodes 121 and 122 alternately disposed in the first direction with the dielectric layer 111 interposed therebetween, and including a first surface 1 and a second surface 2 opposing each other in the first direction, a third surface 3 and a fourth surface 4 connected to the first surface 1 and the second surface 2 and opposing each other in the second direction, and a fifth surface 5 and a sixth surface 6 connected to the first to fourth surfaces 1 to 4 and opposing each other in the third direction; a first external electrode 131 disposed on the third surface 3 and connected to the first internal electrode 121; and a second external electrode 132 disposed on the fourth surface 4 and connected to the second internal electrode 122, and the first internal electrode 121 is connected to the third surface 3 and is spaced apart from the fourth surface 4, the second internal electrode 122 is connected to the fourth surface 4 and is spaced apart from the third surface 3, the first internal electrode 121 includes a first bent portion B1 bent in a region adjacent to the third surface 3, and the second internal electrode 122 includes a second bent portion B2 bent in a region adjacent to the fourth surface 4, and when a straight line in parallel with the second direction and in contact with the first or second internal electrode 121 or 122 is referred to as L1, a straight line connecting a point P1 at which the first internal electrode 121 is in contact with the third surface 3 and the first bent portion B1 or a straight line connecting a point P2 at which the second internal electrode 122 is in contact with the fourth surface 4 and the second bent portion B2 is referred to as L2, an acute angle formed by L1 and L2 is referred to as T, and an average value of the T is referred to as $\overline{T}$, $\tan(\overline{T})$ satisfies 0.1 or more and 0.5 or less.

The body 110 includes the dielectric layer 111 and the internal electrodes 121 and 122 alternately disposed with the dielectric layer 111.

There is no particular limitation on a specific shape of the body 110, but as illustrated, the body 110 may have a hexahedral shape or a shape similar thereto. Due to the shrinkage of ceramic powder particles included in the body 110 during a sintering process, the body 110 is not a hexahedral shape with a complete straight line, but may have a substantially hexahedral shape.

The body 110 may have a first surface 1 and a second surface 2 opposing each other in the first direction, a third surface 3 and a fourth surface 4 connected to the first surface 1 and the second surface 2 and opposing each other in the second direction, a fifth surface 5 and a sixth surface 6 connected to the first surface 1 and the second surface 2, connected to the third surface 3 and the fourth surface 4, and opposing each other in the third direction.

Since a plurality of dielectric layers 111 forming the body 110 are in a sintered state, a boundary between adjacent dielectric layers 111 may be integrated to the extent that the boundary may be difficult to confirm without using a scanning electron microscope (SEM).

According to an exemplary embodiment of the present disclosure, materials for forming the dielectric layer 111 is not particularly limited as long as they can obtain sufficient capacitance. For example, a barium titanate-based material, a lead composite perovskite-based material, or a strontium titanate-based material may be used as the materials therefor.

The barium titanate-based material may include $BaTiO_3$-based ceramic powder particles, and examples of the ceramic powder particles may include $BaTiO_3$, $(Ba_{1-x}Ca_x)TiO_3$ ($0<x<1$), $Ba(Ti_{1-y}Ca_y)O_3$ ($0<y<1$), $(Ba_{1-x}Ca_x)(Ti_{1-y}Zr_y)O_3$ ($0<x<1$, $0<y<1$) or $Ba(Ti_{1-y}Zr_y)O_3$ ($0<y<1$) which is formed by partially employing calcium (Ca) and zirconium (Zr) in $BaTiO_3$, or the like.

Furthermore, as the materials forming the dielectric layer 111, various ceramic additives, organic solvents, binders, dispersants, and the like, may be added to powder particles such as barium titanate ($BaTiO_3$) depending on the purpose of the present disclosure.

The body 110 may include a capacitance formation portion Ac which is disposed in the body 110 and is a region in which the first and second internal electrodes 121 and 122 overlap each other in the first direction.

The capacitance formation portion Ac is a portion that contributes to a capacitance formation of a capacitor, and may be formed by repeatedly stacking a plurality of first and second internal electrodes 121 and 122 with the dielectric layer 111 interposed therebetween.

In an exemplary embodiment, an upper cover portion 112 may be disposed on one surface of the capacitance formation portion Ac in the first direction, and a lower cover portion 113 may be disposed on the other surface of the capacitance formation portion Ac in the first direction.

The upper cover portion 112 and the lower cover portion 113 may be formed by stacking a single dielectric layer or two or more dielectric layers on the upper and lower surfaces of the capacitance formation portion Ac in a thickness direction, and may basically serve to prevent damage to the internal electrodes due to physical or chemical stress.

The upper cover portion 112 and the lower cover portion 113 do not include the internal electrodes, and may include the same material as the dielectric layer 111.

That is, the upper cover portion 112 and the lower cover part 113 portion may include a ceramic material, and may include, for example, a barium titanate ($BaTiO_3$)-based ceramic material.

An average thickness of the cover portions 112 and 113 needs not be particularly limited. However, in order to more easily achieve high capacitance of the multilayer electronic component, the average thickness tc of the cover portion 112 and 113 may be 70 μm or more and 180 μm or less. Here, the average thickness of the cover portions 112 and 113 may denote an average thickness of each of the first cover portion 112 and the second cover portion 113.

The average thickness of the cover portions 112 and 113 may denote a size in the first direction, and may be a value obtained by averaging first directional sizes of the cover portions 112 and 113 measured at five points spaced apart from each other at equal intervals in an upper portion or a lower portion of the capacitance formation portion Ac.

In an exemplary embodiment, a second margin portion M2 may be disposed on one surface and the other surface of the capacitance formation portion Ac in the third direction.

Referring to FIG. 3, the second margin portion M2 may be disposed on a surface facing the body 110 in the third direction (width direction).

As illustrated in FIG. 3, the second margin portion M2 may denote a third directional region between both ends of the first and second internal electrodes 121 and 122 and a boundary surface of the body 110.

The second margin portion M2 may basically serve to prevent damage to the internal electrode due to physical or chemical stress.

The second margin portion M2 may be formed by applying a conductive paste except for a region in which the margin portion will be formed on a ceramic green sheet, and forming the internal electrode.

Alternatively, in order to suppress a step portion caused by the internal electrodes 121 and 122, the internal electrodes 121 and 122 may be stacked and then cut to be exposed to the fifth surface 5 and the sixth surface 6 of the body 110, and then, the second margin portion M2 may be formed by stacking a single dielectric layer or two or more dielectric layers on both side surfaces of the capacitance formation portion Ac in the third direction (width direction).

Meanwhile, an average width of the second margin portion M2 is not particularly limited. However, in order to increase the capacitance of the multilayer electronic component, the average width of the second margin portion M2 may be, preferably, 70 μm or more and 170 μm or less.

The average width of the second margin portion M2 may denote an average size of the second machining part M2 in the third direction, and may be a value obtained by averaging third directional sizes of the second margin portion M2 measured at five points spaced apart from each other at equal intervals on a side surface of the capacitance formation portion Ac.

The internal electrodes 121 and 122 are alternately disposed with the dielectric layer 111 in the first direction.

The internal electrodes 121 and 122 may include first and second internal electrodes 121 and 122. The first and second internal electrodes 121 and 122 may be alternately disposed to oppose each other with the dielectric layer 111 forming the body 110 interposed therebetween, and may be connected to the third surface 3 and the fourth surface 4 of the body 110, respectively. Specifically, one end of the first internal electrode 121 may connected to the third surface 3, and one end of the second internal electrode 122 may be connected to the fourth surface 4. That is, in an exemplary embodiment, the internal electrodes 121 and 122 may be in contact with the third surface 3 or the fourth surface 4.

As illustrated in FIG. 2, the first internal electrode 121 may be spaced apart from the fourth surface 4 and may be exposed through the third surface 3, and the second internal electrode 122 may be spaced apart from the third surface 3 and may be exposed through the fourth surface 4. The first external electrode 131 may be disposed on the third surface 3 of the body 110 and connected to the first internal electrode 121, and the second external electrode 132 may be disposed on the fourth surface 4 of the body 110 and connected to the second internal electrode 122.

That is, the first internal electrode 121 is not connected to the second external electrode 132 and is connected to the first external electrode 131, and the second internal electrode 122 is not connected to the first external electrode 131 and is connected to the second external electrode 132. Accordingly, the first internal electrode 121 may be formed to be spaced apart from the fourth surface 4 by a predetermined distance, and the second internal electrode 122 may be formed to be spaced apart from the third surface 3 by a predetermined distance. In this case, the first and second internal electrodes 121 and 122 may be electrically separated from each other by the dielectric layer 111 disposed in the middle.

In this case, in the body 110, a space from an end of the first internal electrode 121 in the second direction to the fourth surface 4, and a space from an end of the second internal electrode 122 in the second direction to the third surface 3 may be referred to as a first margin portion M1.

Referring to FIG. 4, the body 110 may be formed by alternately stacking a ceramic green sheet on which the first internal electrode 121 is printed and a ceramic green sheet on which the second internal electrode 122 is printed, and then sintering the ceramic green sheets.

A material for forming the internal electrodes 121 and 122 is not particularly limited, and a material having excellent electrical conductivity may be used. For example, the internal electrodes 121 and 122 may include at least one of nickel (Ni), copper (Cu), palladium (Pd), silver (Ag), gold (Au), platinum (Pt), tin (Sn), tungsten (W), titanium (Ti), and alloys thereof.

Furthermore, the internal electrodes 121 and 122 may be formed by printing a conductive paste for internal electrodes including at least one of nickel (Ni), copper (Cu), palladium (Pd), silver (Ag), gold (Au), platinum (Pt), tin (Sn), tungsten (W), titanium (Ti) and alloys thereof, on the ceramic green sheet. A method of printing the conductive paste for the internal electrodes may be a screen printing method, a gravure printing method, but the present disclosure is not limited thereto.

The external electrodes 131 and 132 may be disposed on the third surface or the fourth surface of the body 110. Specifically, the first external electrode 131 is disposed on the third surface 3 and connected to the first internal electrode 121, and the second external electrode 132 is disposed on the fourth surface 4 and connected to the second internal electrode 122.

Although this exemplary embodiment describes a structure in which the multilayer electronic component 100 has two external electrodes 131 and 132, but the number or shape of the external electrodes 131 and 132 may vary, according to the shape of the internal electrodes 121 and 122 or other purpose.

On the other hand, the external electrodes 131 and 132 may be formed using any material as long as the material has electrical conductivity such as metal, and a specific material may be determined in consideration of electrical characteristics, structural stability, and the like, and also, the external electrodes 131 and 132 may have a multilayer structure.

For example, the external electrodes 131 and 132 may include an electrode layer disposed on the body 110 and a plating layer formed on the electrode layer.

For a more specific example of the electrode layer, the electrode layer may be a sintered electrode including conductive metal and glass, or a resin-based electrode including conductive metal and resin.

Furthermore, the electrode layer may have a shape in which the sintered electrode and the resin-based electrode are sequentially formed on the body. Furthermore, the electrode layer may be formed by transferring a sheet including the conductive metal on the body, or by transferring a sheet including the conductive metal on the sintered electrode.

A material having excellent electrical conductivity may be used as the conductive metal included in the electrode layer, and is not particularly limited. For example, the conductive metal may be one or more of nickel (Ni), copper (Cu), and alloys thereof.

The plating layer serves to improve mounting properties. The type of the plating layer is not particularly limited, and may be a plating layer including at least one of Ni, Sn, Pd and alloys thereof, and the plating layer may be formed of a plurality of layers.

As a specific example of the plating layer, the plating layer may be a Ni plating layer or a Sn plating layer, may be a form in which the Ni plating layer and the Sn plating layer are sequentially formed on the electrode layer, and may be a form in which the Sn plating layer, the Ni plating layer, and the Sn plating layer are sequentially formed thereon. Furthermore, the plating layer may include a plurality of Ni plating layers and/or a plurality of Sn plating layers.

Referring to FIG. 2, the first internal electrode 121 includes a first bent portion B1 bent in a region adjacent to the third surface 3, and the second internal electrode 2 includes a second bent portion B2 bent in a region adjacent to the fourth surface 4.

As a manner to improve the capacitance of the multilayer electronic component, there has been an attempt to improve a stacking degree of the internal electrodes and the dielectric layer. In this case, in order for the internal electrodes to be connected to the external electrodes having different polarities, margin portions having different stacking degrees of the internal electrodes may be formed in the body of the multilayer electronic component, and a bent portion may be formed in the internal electrode included in the margin portion by passing through processes such as a stacking process and a compression cutting process. Since the bent portion of the internal electrode is a portion in which the external electrode is formed at an end, it may be vulnerable to external moisture penetration. Accordingly, as the bent portion is formed in the internal electrode, moisture resistance reliability of the multilayer electronic component may be weak.

Accordingly, in the present disclosure, even if the first internal electrode is provided with the bent portion in a region adjacent to the third surface 3 and the second internal electrode is provided with the bent portion in a region adjacent to the fourth surface 4, an angle of the bent portion is intended to be controlled so as not to decrease the moisture resistance reliability of the multilayer electronic component 100.

FIG. 5 is an enlarged schematic view of region A of FIG. 2, and FIG. 8 is a schematic view illustrating a method of determining a straight line L1 according to an exemplary embodiment.

Although FIG. 5 illustrates that the second internal electrode 122 includes a second bent portion B2 in a region adjacent to the fourth surface 4, but the following description may be similarly understood in a region in which the first internal electrode 121 includes the first bent portion B1 in a region adjacent to the third surface 3.

Referring to FIG. 5, a straight line in parallel to the second direction and in contact with the second internal electrodes 121 and 122 may be defined as L1, and a straight line connecting a point P2 at which the second internal electrode 122 is in contact with the fourth surface 4 and the second bent portion B2 may be defined as L2.

More specifically, the L1 may be set by adjusting a straight line in parallel with the second direction so that first directional straight lines (D1, D2, D3, . . . Dn) obtained by dividing the first or second internal electrodes 121 or 122 into n equal portions in the second direction in the capacitance formation portion Ac as illustrated in FIG. 8 and points (G1, G2, G3, . . . Dn) in which a straight line in parallel with the second direction simultaneously meets the first or second internal electrode 121 or 122 are 0.8*n or more. Furthermore, L2 may be a straight line connecting the highest point of the second bent portion B2 in the first direction and the highest point at the first direction among the points in which the second internal electrode 122 is in contact with the fourth surface 4.

In an exemplary embodiment of the present disclosure, when an acute angle formed by L1 and L2 is referred to as T, and an average value of the T is referred to as $\overline{T}$, tan($\overline{T}$) satisfies 0.1 or more and 0.5 or less. Accordingly, moisture resistance reliability of the multilayer electronic component 100 may be improved. When tan($\overline{T}$) is less than 0.1, since a path of external moisture penetration is not sufficiently blocked, an effect of improving moisture resistance reliability of the multilayer electronic component may be somewhat insufficient. When tan($\overline{T}$) exceeds 0.5, due to excessive bending of the bent portions B1 and B2, delamination may occur along a cut surface during a cutting process of forming the body 110, and a step portion between the capacitance formation portion Ac and the first margin portion M1 may be excessively increased to cause the delamination between the internal electrodes 121 and 122 included in the first margin portion M1 and the dielectric layer 111. Such delamination may reduce the moisture resistance reliability of the multilayer electronic component 100. Accordingly, in an embodiment of the present disclosure, it may be possible to properly adjust the angle of the bent portions B1 and B2 to sufficiently block the penetration path of external moisture, and to simultaneously improve moisture resistance reliability of the multilayer electronic component 100 by suppressing the occurrence of delamination due to cutting or the step portion.

A method of measuring an average value $\overline{T}$ of the T is not particularly limited. For example, the value $\overline{T}$ is an arithmetic average value of a T value obtained by polishing the multilayer electronic component 100 to a center thereof in the third direction to expose and polish cross sections thereof in the first and second directions, and then dividing a space between an internal electrode disposed at an uppermost end in the first direction and an internal electrode disposed at a lowermost end in the first direction among the first and second internal electrodes 121 and 122 into five equal portions in the first direction, and measuring the second bending portion B2 of any five or more second internal electrodes 122 disposed between ⅕ and ⅘ points with a scanning electron microscope (SEM). The measurement and obtaining an average value of the value $\overline{T}$ may be further generalized by measuring the first bent portion B1 of the first internal electrode 121 in the same manner. Other measurement methods and/or tools appreciated by one of ordinary skill in the art, even if not described in the present disclosure, may also be used.

The method of adjusting the value $\overline{T}$ is not particularly limited. In a stacking and compression process of manufacturing the body 110 of the multilayer electronic component 100, a method of controlling pressure, time, a stacking degree, composition of a binder, temperature, and the like, may be used.

A direction in which the first and second bent portions B1 and B2 are bent is not particularly limited. For example, the first and second bent portions B1 and B2 may be bent in the first direction through stacking, cutting, and pressing processes in the first direction.

In an exemplary embodiment, a stacking degree (i.e., the number of layers) of the first and second internal electrodes 121 and 122 stacked in the body 110 may be 800 layers or more. As a means of ensuring capacitance of multilayer electronic component, there is provided a method of improving the stacking degree of the first and second internal electrodes 121 and 122. However, as the stacking degree increases, the step portion due to the difference in the number of internal electrodes included in the capacitance formation portion Ac and the first margin portion M1 may be further increased. However, in an exemplary embodiment of the present disclosure, since tan($\overline{T}$) is adjusted to satisfy 0.1 or more and 0.5 or less, even when the step portion between the capacitance formation portion AC and the first margin portion M1 is increased as the stacking degree of the internal electrode is 800 layers or more, it may be possible to improve the moisture resistance reliability of the multilayer electronic component 100. That is, according to an exemplary embodiment, when the stacking degree of the first and second internal electrodes 121 and 122 is 800 layers or more, the effect of improving moisture resistance reliability according to the present disclosure may be more remarkable.

FIG. 6 is a cross-sectional view taken along line I-I' of FIG. 1 corresponding to an exemplary embodiment, and FIG. 7 is an enlarged schematic view of region A' of FIG. 6

Referring to FIGS. 6 and 7, two or more first bent portions B1 may be disposed between an end of a second internal electrode 122 in the second direction and the third surface 3, and two or more second bent portions B2 may be disposed between an end of a first internal electrode 121 in the second direction and the fourth surface 4. Accordingly, adhesive force between the dielectric layer 111 and the first and the second internal electrodes 121 and 122 may be improved in a region between the end of the internal electrode in the second direction and the third or fourth surface, thereby further improving the moisture resistance reliability of the multilayer electronic component 100.

On the other hand, when two or more bent portions B1 and B2 are formed, an angle of the bent portion closest to the third surface 3 or the fourth surface 4 among the bent portions may have the greatest influence on moisture resistance reliability. Accordingly, adjusting the angle of the bent portion closest to the third surface 3 or the fourth surface 4 may be effective in improving moisture resistance reliability of the multilayer electronic component 100.

In an exemplary embodiment, when two or more first and second bent portions B1 and B2 are formed, L2 may be more specifically defined. Referring to FIG. 7, L2 may be a straight line connecting a point P2 at which the second internal electrode 122 is in contact with the fourth surface 4 and a second bent portion closest to the fourth surface 4 among two or more second bent portions B2. When this is applied to two or more first bent portions B1, L2 may be a straight line connecting a point P1 at which the first internal electrode 121 is in contact with the third surface 3 and a first bent portion closest to the third surface 3 among two or more first bent portions B1, or a straight line connecting a point P2 at which the second internal electrode 122 is in contact with the fourth surface 4 and a second bent portion closest to the fourth surface 4 among two or more second bent portions B2.

In an embodiment, when two or more first bent portions B1 are disposed between the end of the second internal electrode 122 in the second direction and the third surface 3 and two or more second bent portions B2 are disposed between the end of the first internal electrode 121 in the second direction and the fourth surface 4, the point P2 at which the second internal electrode is in contact with the fourth surface 4 may be disposed parallel to the second direction and may be spaced apart from L1, which is a straight line in contact with the second internal electrodes 121 and 122. This structure may also be applied between the first internal electrode 121 and the third surface 3. That is, a point at which the first internal electrode 121 is in contact with the third surface 3 may be spaced apart from L1. Meanwhile, in an exemplary embodiment, the two or more first and second bent portions B1 and B2 may be disposed at one side in the first direction based on L1.

In this case, L2 may be a straight line connecting the lowest point of the second bent portion B2 in the first direction closest to the fourth surface 4 and the lowest point at the first direction among points in which the second internal electrode 122 is in contact with the fourth surface 4.

On the other hand, although FIGS. 2, 5, 6 and 7 of the present disclosure express that the first and second bent portions B1 and B2 are bent in the first direction in specific cross-sections in the first and second directions, this does not denote that the bent portions B1 and B2 are formed only in any one cross-section. That is, the first and second bent portions B1 and B2 may be disposed to extend in the third direction, and more specifically, in order to improve a contact area between the dielectric layer 111 and the internal electrodes 121 and 122, the first and second bent portions B1 and B2 may be disposed to continuously extend in the third direction.

An average thickness of the first and second internal electrodes 121 and 122 and an average thickness of the dielectric layer 111 may have various values. Specifically, for an IT multilayer electronic component, the average thickness of the first and second internal electrodes 121 and 122 and the average thickness of the dielectric layer 111 may be 0.35 μm or less, respectively, and a high voltage electric and electronic multilayer electronic component may have an average thickness of the first and second internal electrodes 121 and 122 and an average thickness of the dielectric layer 111 larger than those of the IT multilayer electronic component.

In general, a major issue for the high voltage electric and electronic multilayer electronic component is a decrease in reliability due to a decrease in insulation breakdown voltage under a high-voltage environment. In an exemplary embodiment, when an average thickness of the first and second internal electrodes 121 and 122 is referred to as te, and an average thickness of the dielectric layer 111 is referred to as td, td>2×te may be satisfied to increase a thickness td of the dielectric layer 111 as a distance between the internal electrodes 121 and 122, thereby improving insulation breakdown voltage characteristics.

On the other hand, an absolute value of the average thickness of the first and second internal electrodes 121 and 122 and the average thickness of the dielectric layer 111 is not particularly limited. In an exemplary embodiment, when the average thickness of the first and second internal electrodes 121 and 122 is referred to as te and the average thickness of the dielectric layer 111 is referred as td, te may be less than 1 μm, and td may be 2.8 μm.

The average thickness td of the dielectric layer 111 may denote a first directional average size of the dielectric layer 111 disposed between the first and second internal electrodes 121 and 122. Meanwhile, when the body 110 includes a plurality of dielectric layers 111, the average thickness td of the dielectric layer 111 may denote an average thickness of at least one of a plurality of dielectric layers 111.

The average thickness td of the dielectric layer 111 may be measured by scanning an image of a cross-section of the body 110 in a length and thickness (L-T) direction with a scanning electron microscope (SEM) of 10,000× magnification. More specifically, an average value may be measured by measuring the thickness at 30 points of one dielectric layer in the scanned image, which are spaced apart from each other at equal intervals in a length direction. The 30 points spaced apart from each other at equal intervals may be designated in the capacitance formation portion Ac. In addition, when the average value is measured by extending an average value measurement up to 10 dielectric layers 111, the average thickness of the dielectric layer may be further generalized. For the average thickness td of the dielectric layer 111, other measurement methods and/or tools appreciated by one of ordinary skill in the art, even if not described in the present disclosure, may also be used.

An average thickness te of the internal electrodes 121 and 122 may denote an average size of the internal electrodes 121 and 122 in the first direction. Meanwhile, when the body 110 includes a plurality of internal electrodes 121 and 122, an average thickness td of the internal electrodes 121 and 122 may denote an average thickness of at least one of the plurality of internal electrodes 121 and 122.

The average thickness of the internal electrodes 121 and 122 may be measured by scanning an image of a cross-section of the body 110 in a length and thickness (L-T) direction with a scanning electron microscope (SEM) of 10,000× magnification. More specifically, an average value may be measured by measuring the thickness at 30 points of one internal electrode in the scanned image, which are spaced apart from each other at equal intervals in a length direction. The 30 points spaced apart from each other at equal intervals may be designated in the capacitance formation portion Ac. In addition, when the average value is measured by extending an average value measurement up to 10 internal electrodes, the average thickness of the dielectric layer may be further generalized. For the average thickness of the internal electrodes 121 and 122, other measurement methods and/or tools appreciated by one of ordinary skill in the art, even if not described in the present disclosure, may also be used.

Meanwhile, in an exemplary embodiment, when a space between an end of the first internal electrode in the second direction and the fourth surface in the body and a space between an end of the second internal electrode in the second direction and the third surface is referred to as a first margin portion M1, an average width of the first margin portion may be 70 μm to 170 μm. Accordingly, moisture resistance reliability of the multilayer electronic component 100 may be improved simultaneously with securing sufficient capacitance.

Example

Samples used in a moisture resistance reliability evaluation below were prepared according to the following method.

First, barium titanate powder particles, ethanol as an organic solvent, and polyvinyl butyral as a binder were mixed, and ball-milled to produce a ceramic slurry, and a ceramic green sheet was produced using the ceramic slurry.

Then, a conductive paste for an internal electrode including nickel was printed on a ceramic green sheet to form an internal electrode, and a green laminate in which the internal electrode was stacked was subjected to isostatic compression molding by changing pressure and temperature conditions for each test number.

The compressed green laminate was cut to make a green chip, and after a debinding process in which the cut green chip was maintained at 340° C. for 60 hours or more under atmospheric conditions, the green chip was sintered at 1100° C. or higher to produce a sintered chip. Sintering was performed in a reducing atmosphere to prevent oxidation of the internal electrode.

An electrode layer was formed on the outside of the sintered chip using an external electrode paste including copper powder particles and glass powder particles, and a nickel plating layer and a tin plating layer were formed on the electrode layer through electroplating.

The characteristics of the multilayer electronic component manufactured according to the method were evaluated as follows.

A tan($\overline{T}$) value was adjusted by controlling the pressure and temperature during the isostatic compression molding process, and a reliability evaluation of moisture resistance was conducted according to the tan($\overline{T}$) value and is shown in Table 1. The reliability evaluation of moisture resistance was conducted for 15 hours for 750 samples of a multilayer electronic component per test number under an environment having a temperature of 85° C., relative humidity of 85%, and 1.5 Vr, and a sample in which a value of insulation resistance was reduced 10^7 times from an initial value was determined as a defective product.

Tan($\overline{T}$) was confirmed by selecting 30 samples from 750 samples for each test number, measuring $\overline{T}$ and obtaining average values thereof. Specifically, after polishing a sample to a center thereof in the third direction to expose surfaces in the first and second directions, in a region in which a space between an internal electrode disposed at an uppermost end and an internal electrode disposed at a lowermost end in the first direction was divided into five equal portions in the first direction among the first and second internal electrodes 121 and 122, the arithmetic mean value was calculated by measuring T, respectively, using a scanning electron microscope (SEM). The value $\overline{T}$ measured in one sample was conducted in the same manner in 30 samples, and an average value was obtained again and a tan value was obtained. In this case, when a plurality of bent portions of the internal electrode are formed, T was measured for the bent portion closest to the third or fourth surface of the body.

TABLE 1

| Test Number | tan ($\overline{T}$) | Moisture resistance reliability (number of defective products/ total number of samples) |
|---|---|---|
| 1 | 0.1 | 0/750 |
| 2 | 0.2 | 0/750 |
| 3 | 0.3 | 0/750 |
| 4 | 0.4 | 0/750 |
| 5 | 0.5 | 0/750 |
| 6 | 0.6 | 1/750 |
| 7 | 0.7 | 2/750 |
| 8 | 0.8 | 1/750 |
| 9 | 0.9 | 8/750 |
| 10 | 1 | 11/750 |

Referring to Test Numbers 1 to 5, it may be found that moisture resistance reliability is excellent when the tan($\overline{T}$) value is 0.1 or more and 0.5 or less.

Referring to Test Numbers 6 to 10, it may be found that the tan($\overline{T}$) value exceeds 0.5, an effect of improving the moisture resistance reliability is reduced, and with an increase in the tan($\overline{T}$) value, the moisture resistance reliability decreases. This is expected to be a result of delamination due to cutting or a step portion as the tan($\overline{T}$) value exceeds 0.5.

Accordingly, it may be found that the tan($\overline{T}$) value may be adjusted to 0.1 or more and 0.5 or less as in an exemplary embodiment of the present disclosure, thereby improving the moisture resistance reliability of the multilayer electronic component 100.

Although various exemplary embodiments of the present disclosure have been described in detail above, the present disclosure is not limited to the above-described embodiments and the accompanying drawings but is defined by the appended claims. Therefore, those of ordinary skill in the art may make various replacements, modifications, or changes without departing from the scope of the present disclosure defined by the appended claims, and these replacements, modifications, or changes should be construed as being included in the scope of the present disclosure.

In addition, the expression 'an exemplary embodiment' used in the present disclosure does not denote the same exemplary embodiment, and is provided to emphasize and explain different unique characteristics. However, the exemplary embodiments presented above do not preclude being implemented in combination with the features of another embodiment. For example, although items described in a specific embodiment are not described in another embodiment, the items may be understood as a description related to another embodiment unless a description opposite or contradictory to the items is in another embodiment.

The terms used in the present disclosure are used only to describe an exemplary embodiment and are not intended to limit the present disclosure. In this case, a singular expression includes plural expressions unless the context clearly indicates otherwise.

What is claimed is:

1. A multilayer electronic component comprising:

a body including a dielectric layer and first and second internal electrodes alternately disposed in a first direction with the dielectric layer interposed therebetween, and including a first surface and a second surface opposing each other in the first direction, a third surface and a fourth surface connected to the first surface and the second surface and opposing each other in a second direction, and a fifth surface and a sixth surface connected to the first surface to the fourth surface and opposing each other in a third direction;

a first external electrode disposed on the third surface and connected to the first internal electrode; and a second external electrode disposed on the fourth surface and connected to the second internal electrode, wherein the first internal electrode is connected to the third surface and is spaced apart from the fourth surface, and the second internal electrode is connected to the fourth surface and is spaced apart from the third surface, the first internal electrode includes a first bent portion bent in a region adjacent to the third surface, and the second internal electrode includes a second bent portion bent in a region adjacent to the fourth surface, and when a straight line in parallel with the second direction and in contact with the first or second internal electrode is referred to as L1, a straight line connecting a point, at which the first internal electrode is in contact with the third surface, and the first bent portion or a straight line connecting a point, at which the second internal electrode is in contact with the fourth surface, and the second bent portion is referred to as L2, an acute angle formed by L1 and L2 is referred to as T, and an average value of the T is referred to as $\overline{T}$, and wherein the average value of T is determined based on T values measured for bent portions of at least five internal electrodes disposed between ⅕ and ⅘ positions in the first direction between an uppermost internal electrode and a lowermost internal electrode in the body, and tan($\overline{T}$) satisfies 0.1 or more and 0.5 or less.

2. The multilayer electronic component according to claim 1, wherein the first and second bent portions are bent in the first direction.

3. The multilayer electronic component according to claim 1, wherein a number of layers of the first and second internal electrodes stacked in the body is 800 or more.

4. The multilayer electronic component according to claim 1, wherein the first internal electrode includes two or more first bent portions, including the first bent portion, disposed between an end of the second internal electrode and the third surface in the second direction, and the second internal electrode includes two or more second bent portions, including the second bent portion, disposed between an end of the first internal electrode and the fourth surface in the second direction.

5. The multilayer electronic component according to claim 4, wherein the L2 is a straight line connecting a point, at which the first internal electrode is in contact with the third surface, and a first bent portion of the two or more first bent portions which is closest to the third surface, or a straight line connecting a point, at which the second internal electrode is in contact with the fourth surface, and a second bent portion of the two or more second bent portions which is closest to the fourth surface.

6. The multilayer electronic component according to claim 1, wherein the first and second bent portions each extend in the third direction.

7. The multilayer electronic component according to claim 4, wherein a point at which the first internal electrode is in contact with the third surface and a point at which the second internal electrode is in contact with the fourth surface are spaced apart from the L1.

8. The multilayer electronic component according to claim 4, wherein the two or more first and second bent portions are disposed on one side in the first direction based on the L1.

9. The multilayer electronic component according to claim 1, wherein, when an average thickness of the first and second internal electrodes is referred to as te and an average thickness of the dielectric layer is referred to as td, te is less than 1 μm and td is less than 2.8 μm.

10. The multilayer electronic component according to claim 1, wherein when an average thickness of the first and second internal electrodes is referred to as te and an average thickness of the dielectric layer is referred to as td, $td>2\times te$ is satisfied.

11. The multilayer electronic component according to claim 1, wherein in the body, when a space from an end of the first internal electrode in the second direction to the fourth surface and a space from an end of the second internal electrode in the second direction to the third surface are a first margin portion, the average width of the first margin portion in the second direction is 70 μm or more and 170 μm or less.

12. The multilayer electronic component according to claim 1, wherein in the body, a region in which the first and second internal electrodes overlap each other in the first direction is referred to as a capacitance formation portion, a cover portion is disposed on one surface and the other surface of the capacitance formation portion in the first direction, and an average thickness of the cover portion is 70 μm or more and 180 μm or less.

13. The multilayer electronic component according to claim 1, wherein in the body, when a region in which the first and second internal electrodes overlap each other in the first direction is referred to as a capacitance formation portion, a second margin portion is disposed on one surface and the other surface of the capacitance formation portion in the third direction, and an average width of the second margin portion in the third direction is 70 μm or more and 170 μm or less.

* * * * *